Patented May 15, 1923.

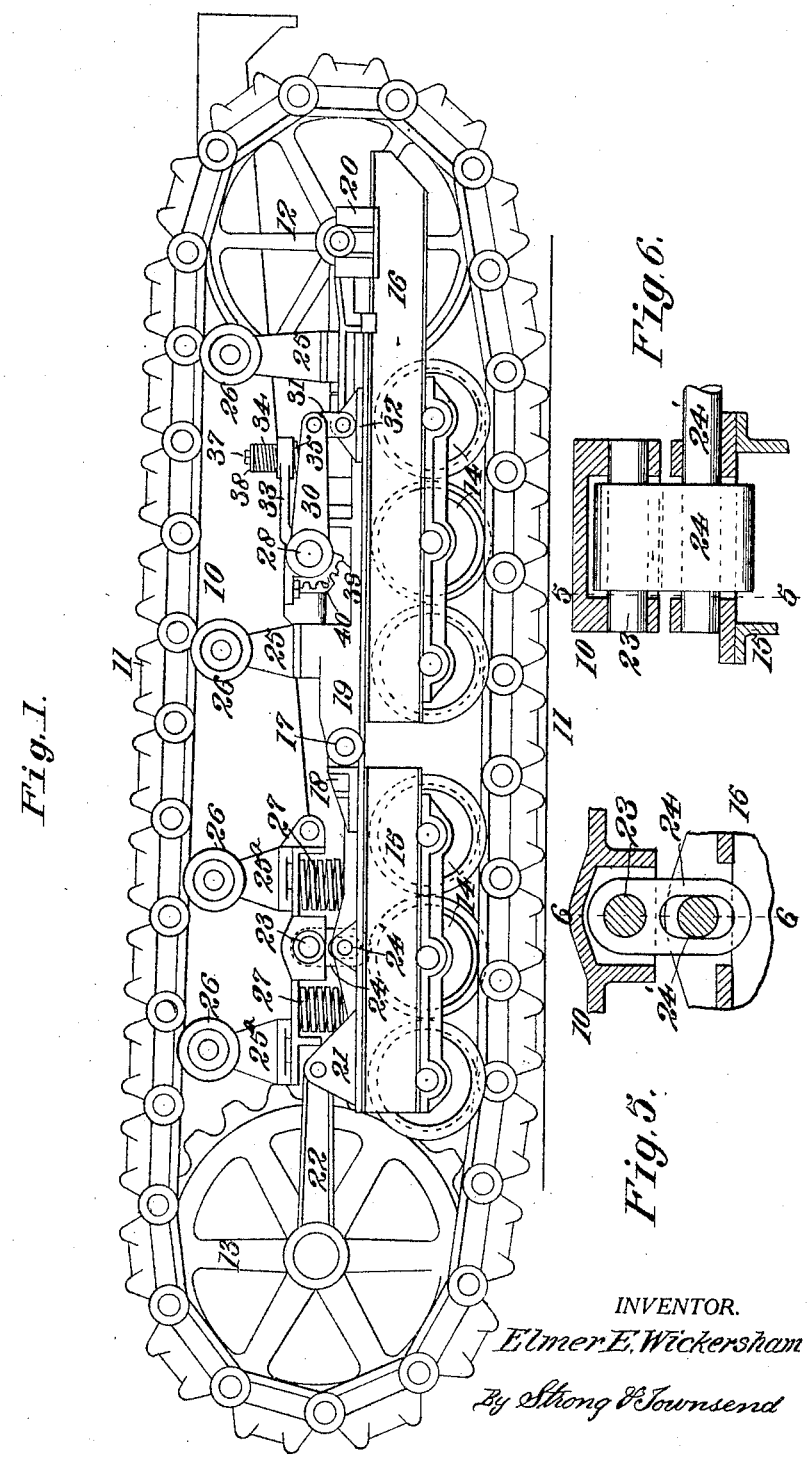

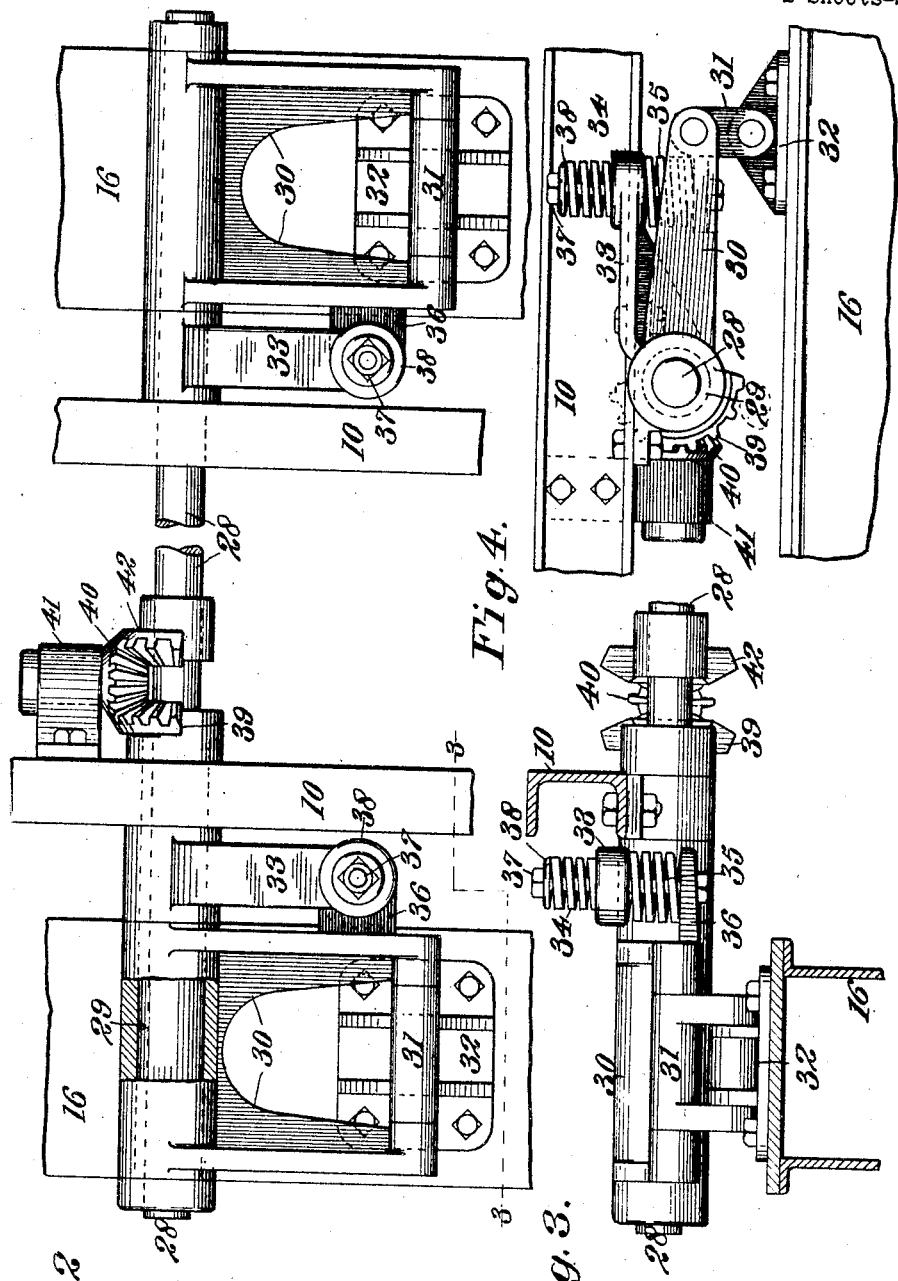

1,455,465

UNITED STATES PATENT OFFICE.

ELMER E. WICKERSHAM, OF STOCKTON, CALIFORNIA, ASSIGNOR TO THE HOLT MANUFACTURING COMPANY, OF STOCKTON, CALIFORNIA, A CORPORATION OF CALIFORNIA.

FRAME SUSPENSION FOR TRACTION ENGINES.

Application filed August 13, 1918. Serial No. 249,611.

*To all whom it may concern:*

Be it known that I, ELMER E. WICKERSHAM, a citizen of the United States, residing at Stockton, in the county of San Joaquin and State of California, have invented new and useful Improvement in Frame Suspensions for Traction Engines, of which the following is a specification.

This invention relates to a traction engine, and particularly pertains to a frame suspension therefor.

It is the principal object of this invention to provide a tractor of the type employing a pair of self-laying track truck mechanisms on which the main frame is mounted, with means for suspending its frame from separate truck units in a manner to equalize the variable movement of these units, and to reduce the movement of the frame tending to throw it from a horizontally aligned position.

The invention is illustrated by way of example in the accompanying drawings, in which—

Fig. 1 is a view in side elevation, illustrating a tractor, the frame of which is suspended by the structure with which the present invention is concerned.

Fig. 2 is a fragmentary view in plan, illustrating the equalizer mechanism.

Fig. 3 is a view in side elevation, illustrating a portion of the equalizer mechanism and the manner in which it is connected to the main frame and the truck roller frames.

Fig. 4 is a view in end elevation, illustrating a portion of the equalizer structure.

Figs. 5 and 6 are views in section and elevation, illustrating the mounting of the stabilizing link.

In the drawings, 10 indicates a main frame, at the opposite sides of which are endless tracks 11 which pass over idler wheels 12 and driving sprockets 13. The lower run of these chains form self-laying tracks for rollers 14. In the present instance these rollers are divided into sets which are carried by rear roller frames 15 and forward roller frames 16. These two frame members are articulately connected by pins 17. These pins extend through bearings 18 and 19 fixed to the adjacent ends of the roller frames. The bearing 19 is fixed to the rear end of the forward frame section, while the forward end of this section is provided with a sliding bearing 20 which carries the shaft of the idler wheel 12. The rear frame section 15 is further tied to the axle of the driving sprockets 13 by means of a standard 21 to which is pivoted a radius rod 22.

The rear truck section is centrally pivoted to a frame casting by a pin 23 which is engaged by a stabilizing link 24 dependent therefrom. The lower end of this link is pivoted to the roller frame by a pivot pin 24'. It is to be noted that the links 24 are of considerable width and thus resist twisting of the roller truck frames while allowing them vertical movement. The apertures through the lower ends of the links to accommodate pins 24' are slotted to permit vertical vibration of the truck frames without longitudinal movement. The forward truck frame casting also carries standards 25 upon which are track chain supporting rollers 26. The standards 25$^a$ and supporting rollers for the rear portion of the chain track are preferably mounted directly upon the main frame. Interposed between the frame casting and the truck section 15 are expansion springs 27. These springs are disposed at opposite sides of the pivotal center of the trucks and thus act to stabilize them.

The forward truck sections are provided with an equalizer mechanism which allows them to swing in relation to each other and to also move in relation to the rear sections 15. This will insure that the lower run of the chain track will conform to the ground over which it travels. The equalizer mechanism consists of a transversely extending shaft 28 suitably housed in bearings carried by the main frame.

As shown in Fig. 3, one end of this shaft 28 is enclosed within a tubular sleeve 29 which extends outwardly through a shackle arm 30 and provides a pivotal mounting therefor. This shackle arm in turn is fitted with a pivoted stabilizing link 31 which is also pivotally mounted to a standard 32 upon the roller frame member 16. Interposed between the side rail of the main frame and the shackle member 30 is a radius arm 33 which is fixed to the sleeve 29. This arm extends forwardly and is provided with upper and lower expansion springs 34 and 35. The lower of these springs is placed between the under face of the arm and a lug 36 extending outwardly from the shackle member 30. A spring bolt 37 extends upwardly through the lug, the two springs 34 and 35 and a washer 38. Thus swinging movement of the radius arm will be yieldably opposed by the two springs.

The sleeve 29 extends inwardly through the frame bearing and is fitted at its inner end with a segmental bevel gear 39. The gear 39 is in mesh with a bevel pinion 40 formed at the end of a stub shaft which is carried by a bearing 41. Disposed on the opposite side of the pinion from the gear 39 is a segmental gear 42. This last named gear is fixed to the shaft 28. The opposite end of the shaft from that previously described is fitted with a freely mounted shackle 30, an equalizer link 31 and the radius arm 33. This arm is directly secured to the shaft, however. Due to this arrangement, movement of one radius arm will cause the other radius arm to move in an opposite direction.

In operation, the separate trucks may swing in relation to each other upon their hinge pins 17, at the same time permitting the rear truck sections 15 to swing in relation to the main frame as determined by the radius link 22 and the links 24 and as resisted by the expansion springs 27. The forward frame portions 16 may swing in relation to the frame body and as one of these portions moves, it will swing a corresponding shackle member 30. The lug 36 upon the shackle will move upwardly and compress the spring 35. Thus the upward movement of the truck section will be resisted and its force partially absorbed. After the spring 35 has reached the maximum compression, the radius arm 33 will swing. Assuming this arm to be the one mounted upon the sleeve 29, it will rotate the gear 39, the gear 40 and thereafter the gear 42. The direction of rotation of the gears 39 and 42 will be opposite. This will rotate the shaft 28 in an opposite direction from the sleeve 29 and will cause the arm 33, which is directly mounted upon the shaft, to swing downwardly while the arm 33 upon the sleeve swings upwardly. The downward pressure of the arm 33 as exerted by the shaft will tend to compress the corresponding spring 35 and thus will cause the vehicle frame to be elevated. Due to the reverse movement of the two arms, however, the amount of elevation of the frame will be one half of the difference in elevation between the two truck units.

It will thus be seen that the structure here disclosed provides a yieldable mounting for articulated truck frames to insure that the track chain will conform to the ground over which it passes and to further resiliently support the main frame in a manner to absorb minor vibrations of the trucks and to diminish the movement of the main frame in relation to the truck movement.

In some types of tractors the power plant and transmission housing in and of themselves constitute the main frame. Hence, the term "main frame," as used herein, is intended to apply generally to suspended structure, regardless of its form.

Having thus described my invention, what I claim and desire to secure by Letters Patent is:

1. In a tractor a main frame, a chain track truck mechanism at each side thereof, means for supporting the forward end of the main frame upon the truck mechanism in a manner to equalize the weight of the main frame thereon, crank arms included in said supporting means and axially rotatable connections between the crank arms whereby the upward movement of one of the arms will impart a downward movement to the opposite arm.

2. The combination set forth in claim 1 including resilient means for cushioning the movement of the crank arms in both directions.

3. In a vehicle a main frame, a chain track truck mechanism at each side thereof, an equalizing load-supporting connection between each truck mechanism and the adjacent side of the main frame comprising a crank arm between each truck mechanism and the main frame, and rotatable connecting means including intermeshing gears between opposite crank arms operable upon an upward movement of one of the arms to impart a downward movement to the opposite arm.

4. In a vehicle a main frame, a chain track truck mechanism at each side thereof, an equalizing load-supporting connection between each truck mechanism and the adjacent side of the main frame comprising a shaft rotatably carried by the main frame, and shackle arms pivotally connecting the opposite ends of the shaft with the truck mechanisms and movable in opposite directions.

5. In a four-point support track laying tractor, means for equalizing the strains on the track laying units comprising an axially rotatable transversely disposed member provided with oppositely rotating operative members adapted to co-act with the traction units and transmit vertical motion of one unit to the other.

6. In a tractor construction, an equalizing mechanism comprising a transversely disposed rotatable shaft carried by the main frame of the tractor, freely pivoted pressure arms extending from the opposite ends of the shaft, radius arms carried by the opposite ends of the shaft, yieldable means connecting the pressure arms and the radius arms, and connecting means between the radius arms and shaft, whereby movement of one radius arm by its pressure arm will tend to produce a movement of the other pressure arm by its radius arm in an opposite direction.

7. In a vehicle, a main frame, a chain track truck mechanism at each side thereof and a load-supporting connection between opposite truck mechanisms for suspending the weight of the main frame equally thereon, said load-supporting connection comprising rotatable means extending transversely of the main frame and crank arms on the rotatable means connected thereto for movement in opposite directions, each crank arm being operatively connected at its outer end to one of said truck mechanisms.

8. In a vehicle, a main frame, a chain track truck mechanism at each side thereof, a load-supporting connection between opposite truck mechanisms for suspending the weight of the main frame equally thereon, said load-supporting connection comprising rotatable means extending transversely of the main frame, crank arms between the rotatable means and each truck mechanism and connections between the crank arms and rotatable means whereby an upward movement of one crank arm will impart a downward movement to the opposite crank arm.

9. In a vehicle, a main frame, a chain track truck mechanism at each side thereof, a load-supporting connection between the truck mechanisms for supporting the main frame equally upon opposite truck mechanisms, said load-supporting connection comprising a two-part shaft journaled on the main frame, a rock arm connecting each shaft member to one of the truck mechanisms and connections between the parts of the shaft operative to cause a downward pressure upon one of the truck mechanisms when the opposite truck mechanism moves upwardly.

10. In a vehicle, a main frame, a chain track truck mechanism at each side thereof, a load-supporting connection between the truck mechanisms for supporting the main frame equally upon opposite truck mechanisms, said load-supporting connection comprising a two-part shaft journaled on the main frame, each shaft member being operatively connected to one of the truck mechanisms whereby vertical movement of the truck mechanism will impart a rotative movement to the shaft, a bevel gear on each shaft and an intermeshing gear connecting said bevel gears whereby to impart movement from one shaft to the other in opposite directions.

In testimony whereof I have hereunto set my hand in the presence of two subscribing witnesses.

ELMER E. WICKERSHAM.

Witnesses:
 JOHN H. HERRING,
 W. W. HEALEY.